United States Patent [19]
Mackey

[11] Patent Number: 5,398,416
[45] Date of Patent: Mar. 21, 1995

[54] UNIVERSAL STRING TRIMMER REPLACEMENT HEAD

[76] Inventor: Robert T. Mackey, 321 Powder Mill Dr., Ashland City, Tenn. 37015

[21] Appl. No.: 176,749

[22] Filed: Jan. 3, 1994

[51] Int. Cl.$^6$ .............................................. A01D 34/63
[52] U.S. Cl. ........................................ 30/347; 30/276; 56/295
[58] Field of Search .................... 30/276, 347; 56/12.7, 56/295

[56] References Cited

U.S. PATENT DOCUMENTS

| | | | |
|---|---|---|---|
| 4,062,114 | 12/1977 | Luick | 30/276 |
| 4,644,655 | 2/1987 | Bottamiller et al. | 30/347 |
| 4,756,146 | 7/1988 | Rouse | 56/12.7 |
| 4,905,465 | 3/1990 | Jones et al. | 56/295 |
| 5,197,264 | 3/1993 | Lacey | 56/12.7 |
| 5,276,969 | 1/1994 | Luick | 30/276 |

*Primary Examiner*—Richard K. Seidel
*Assistant Examiner*—Hwei-Siu Payer
*Attorney, Agent, or Firm*—Waddey & Patterson; I.C. Waddey, Jr.

[57] ABSTRACT

My invention is a replacement head for string trimmers and includes a block, the block being constructed of metal or alloy having the characteristics of strength, rigidity and generally having a hardness to withstand the abuse received by the rotating element of a string trimmer. The block is preferably of a cylindrical shape being essentially a solid piece with a flat top and bottom, the top and bottom of the block having planes essentially parallel to each other. Cut into the top of the block is a counterbore which is internally threaded to be screwed onto the threaded sinaft of the string trimmer. At or near the bottom of the block are two channels, each passing through tile block, the channels being essentially in a stacked relationship mid generally extending perpendicularly to each other. A monofilament string of a defined length is threaded through one channel, wound about the outer peripheral of the block to an opening of the second channel and passed through the second channel, wound about the outer peripheral of the block to the opening of the first channel and pass through the first channel a second time. Each end of the monofilament is then pulled tightly so that two ends of the monofilament extend from the block and the monofilament is tightly connected to the block.

9 Claims, 2 Drawing Sheets

UNIVERSAL STRING TRIMMER REPLACEMENT HEAD

BACKGROUND OF THE INVENTION

The present invention relates generally to string trimmers and more particularly to lawn and garden trimming devices using a monofilament string as the cutting/trimming element, the monofilament being whirled at a rapid speed by its attachment to a rotating motor. The original device of the character to which this invention relates has been marketed for years under the registered trademark "Weedeater®", but other manufacturers now make and sell a variety of similar string trimmer type devices.

It will be appreciated by those skilled in the art that string trimmer devices generally employ a monofilament as the cutting element of the trimmer. The monofilament is made from a synthetic, often extruded, material. The monofilament is connected to the shaft of a motor and as the motor is activated, the shaft rotates at a high rate of speed causing the monofilament to whip about its axis and tear or shred anything in its path. In the normal case, only one end of the monofilament extends from the trimmer and as that end comes in contact with grass, weeds, the earth, sidewalks or the like in the course of its use, the end of the monofilament will tend to shred or tear. Thus, the end of the monofilament extending from the trimmer will become shorter and shorter with use until it is frayed to a point where little if any portion of the monofilament extends beyond the point where it is connected to the rotating shaft of the trimmer.

When the rotating monofilament frays to the point where there is little or no length to the end extending beyond the rotating shaft, the monofilament must then be lengthened. A variety of devices have been structured to facilitate this process. In its most rudimentary construction, the monofilament would be wound about the shaft of the motor or the housing connected to the shaft of the motor and the user of the trimmer would have to grip the end of the monofilament extending from the housing and manually pull it from the spool contained within the housing so as to lengthen the end of the monofilament. Improvements were developed so that the base of the housing of the carrier of the monofilament could be tapped on a surface such as the ground or sidewalk as the unit was rotating, and the mechanical gripping of the monofilament would be released and the centrifugal force of the turning of the device about the shaft would cause the end of the monofilament to extend from the housing and the duration and number of taps on the bottom of the trimmer would control the length to which the monofilament would extend beyond the housing.

The difficulty that has been observed by Applicant with the types of devices just described is that they are generally made of plastic or similar material and tapping the bottom of the trimmer will eventually result in the housing for the monofilament being cracked or broken. This is a particular problem in commercial usage of trimmers, and once the housing for the coil of monofilament is broken, it is difficult and expensive to replace. In addition, with only one end of the monofilament extending from the trimmer, the trimming process takes longer and the end of the monofilament is frayed and torn from the monofilament after only a short usage. Therefore, the user of the trimmer must continually extend the end of the monofilament by tapping the end of the trimmer onto the ground, a sidewalk or the like, thereby increasing the likelihood of destruction of the monofilament coil housing.

Considering these problems with the prior art devices, there is a need for a replacement head for string trimmers which overcomes the deficiencies of the prior art. Such a device is presently unavailable and does not appear to be suggested by the prior art.

SUMMARY OF THE INVENTION

My invention is a replacement head for string trimmers and includes a block, the block being constructed of metal or alloy having the characteristics of strength, rigidity and generally having a hardness to withstand the abuse received by the rotating element of a string trimmer. The block is preferably of a cylindrical shape being essentially a solid piece with a flat top and bottom, the top and bottom of the block having planes essentially parallel to each other. Cut into the top of the block is a counterbore which is internally threaded to be screwed onto the threaded shaft of the string trimmer.

At or near the bottom of the block are two channels, each passing through the block, the channels being essentially in a stacked relationship and generally extending perpendicularly to each other.

A monofilament string of a defined length is threaded through one channel, wound about the outer peripheral of the block to an opening of the second channel and passed through the second channel, wound about the outer peripheral of the block to the opening of the first channel and pass through the first channel a second time. Each end of the monofilament is then pulled tightly so that two ends of the monofilament extend from the block and the monofilament is tightly connected to the block.

In operation, when the replacement head is mounted onto a standard string trimmer, the monofilament extends from the block with two ends exposed and rotating when the trimmer is in operation. Thus, twice the cutting power is available, therefore decreasing the speed with which the ends of the monofilament will fray and tear and increasing the amount of time and usage received from a replacement head threaded in this fashion.

When the ends of the monofilament do fray to a point where the device is no longer effective, the monofilament is quickly removed from the replacement head and a new monofilament is re-threaded by hand onto it. While this process may appear to cumbersome because it has to be manually threaded as opposed to some automatic feeding device for the monofilament, my experience shows that the time to change the monofilament is minimal as compared to the advantages that are achieved. Those advantages include having two ends of the monofilament extending from the head and the associated increase in production and decrease in wear, tear, damage and replacement time and cost involved in replacing the housings for spool type feeders for the string trimmers of the prior art.

DESCRIPTION OF THE PREFERRED EMBODIMENT

Figure 1:
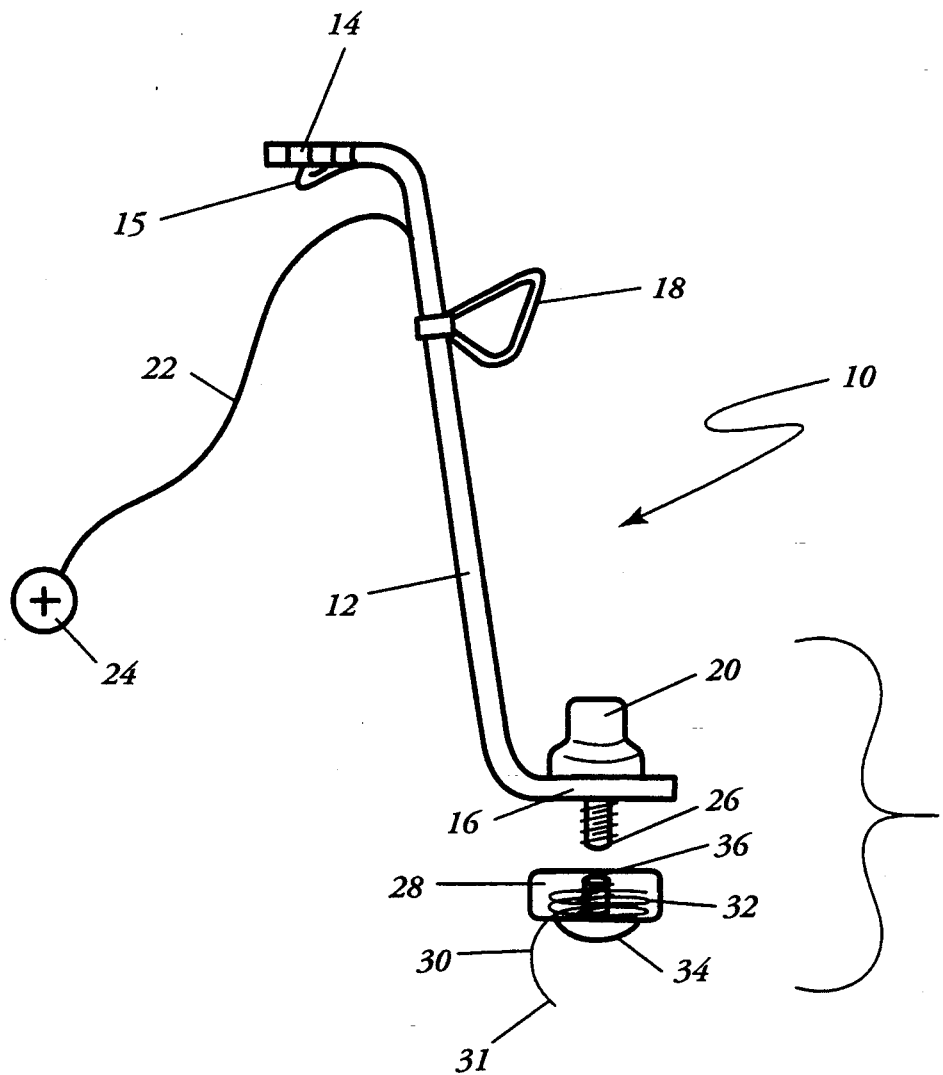
FIG. 1 shows string trimmers of the type for which the replacement head of this invention is designed.
Figure 4:
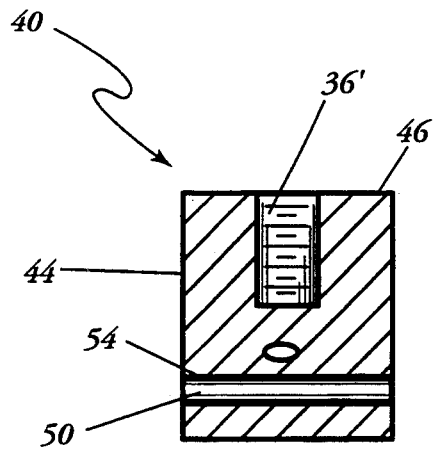
FIG. 4 shows a cross-sectional view of the replacement head of the present invention.
Figure 3:
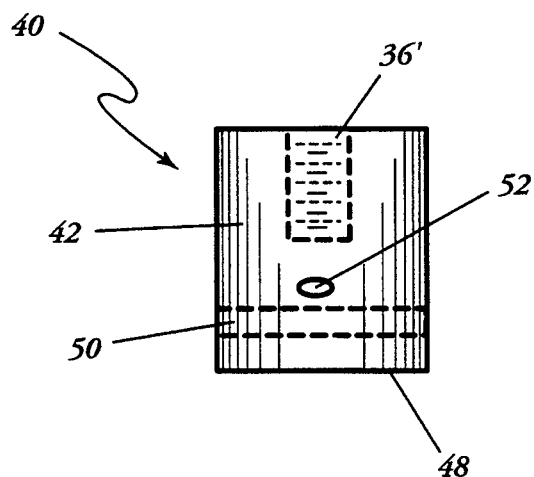
FIG. 3 shows a side view of the replacement head of the present invention.

A string trimmer of the type for which my invention is designed is shown as an illustration of the prior art in FIG. 1. The string trimmer 10 includes a frame 12 which is customarily a tubular bar having a handle 14 at the top and a base 16 at the bottom. The base may be a flattened platform which can be integral with the frame 12 or bolted (not shown) to the frame 12. A grip 18 is normally connected to the frame 12. Grip 18 will normally be clamped onto the frame 12 and its location can be adjusted along the length of the frame 12 so that the user of the trimmer can hold the handle 14 in one hand and the grip 18 in the other and maneuver the trimmer to cut weeds, edge sidewalks or the like.

The string trimmer 10 will generally have a motor 20 mounted on the base 16. The motor 20 can be gasoline driven in which event a gas tank (not shown) is mounted on the base. In the embodiment shown in FIG. 1, the motor of the string trimmer 10 is electrically driven and is powered by energy passing through extension cord 22 which is connected to a power source 24. A trigger mechanism 15 is usually provided on the handles 14 so that the speed of the trimmer can be adjusted by the user.

The motor 20 is mounted on the base 16 so that the shaft 26 of the motor 20 penetrated through the base and extends downwardly from the base 16. The shaft 26 is threaded and is adapted to have connected to it the string housing 28. The string housing 28 has a counterbore 36 which is internally threaded and screws onto the threaded shaft 26.

The string housing 28 of the prior art devices will normally house a monofilament 30 which is wound about the core of the string housing. A supply of monofilament in a continuous strand 32 is wound 32 about the core with one end 31 of the monofilament extending from the housing, generally to a length of 12"–18".

In operation, the string trimmer 10 is started either by turning on a switch of an electrically driven device or by the pull chord starting of a gasoline driven device. Once the motor 20 of the string trimmer is started, the shaft 26 will rotate rapidly and the speed of the rotation of the shaft 20 can be adjusted by depressing and releasing the trigger 15 which controls the power supply (either electrical or gasoline) delivered to the motor.

The rotation of the shaft 26 in turn causes the rotation of the string housing 28 or of the core of the string housing about which is wrapped the wound supply 32. The rotation of the string housing 28 (or the core within the string housing) will cause the rotation of the monofilament and particularly, the end 31 of the monofilament 30 that is extending from the housing 28. The rapid rotation of the end 31 of the monofilament 30 provides the cutting edge for the string trimmer of the prior art devices. The rapid rotation of the end 31 of the monofilament 30 will be positioned to engage the material to be cut-grass, a trench in the earth, the edging along a sidewalk, weeds in a close area or the like. As the end 31 of the monofilament 30 rotates rapidly and engages the material to be cut, the sidewalks against which the weeds have grown or other abrading surfaces, the end 31 of the monofilament 30 will tend to fray, abrade and tear off. Thus, the end of the monofilament 30 will shorten continuously with the use of the device until such time as little if any of the monofilament extends beyond the housing 28. When that occurs, there is no cutting edge and the monofilament must be pulled from the wound supply 32 contained within the housing 28. This can be done manually or, with more modem devices in which the monofilament 30 is gripped to hold it into position, an advancer 34 generally positioned on the bottom of the housing 28, can be tapped as the housing is rotating and the gripping mechanism will be released. When the gripping mechanism is released, the centrifugal force of rotation of the device causing the monofilament to extend from the housing. Tapping the advancer several times will cause greater lengths of the monofilament to extend from the housing, however, tapping the advancer must occur as the device is in rotation and therefore tends to abrade the advancer and cause it to crack and break or otherwise become damaged. This deficiency of the prior art is most pronounced when the housing 28 and advancer 34 are made of a plastic material as is the usual case. The prior art devices tend to crack, abrade or otherwise become damaged, particularly in commercial uses of string trimmers of this type and must often be replaced at substantial expense of down time and replacement cost of the article itself.

Figure 2:
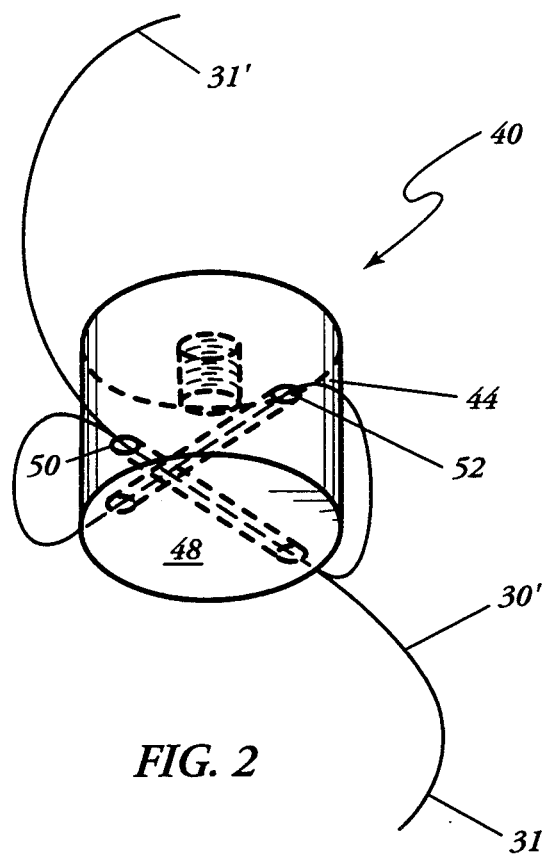
FIG. 2 shows a perspective view of the replacement head of the present invention.

The improvement of my invention is to eliminate the string housing 28 and associated wound supply 32 of monofilament 30. My device is a replacement head 40 shown generally in a perspective view in FIG. 2. The replacement head 40 includes a block 42 of solid metal having strength, rigidity, and hardness. The block 42 can be of a variety of shapes but the preferred shape as shown and illustrated is cylindrical, having an outer peripheral 44 with top 46 and bottom 48. The top 46 and bottom 48 each are flat and in a plane with the plane of the top 46 being substantially parallel to the plane of the bottom 48.

The replacement head 40 has a counterbore 36' which is internally threaded and adapted to fit by threaded engagement with the threaded shaft 26 of the prior art string trimmers 10. The counterbore 36' is in the top of the block 42 and penetrates part way into the replacement head but does not extend all the way through the placement head. The counterbore 36' is concentric with the axis of the cylindrically shaped block 42 to provide balance and eliminate vibration of the system as the replacement head rotates about the shaft 26 of the trimmer.

Block 42 has at or near the bottom 48 a channel 50 extending through the block creating a passageway in it. Above the channel 50 is a second channel 52. The second channel 52 is preferably perpendicular to the first channel 50 and both channel 50 and 52 are perpendicular to the axis of the block 42.

Engaged within the channels 50, 52 of the block 42 is a length of monofilament of 30'. The monofilament 30' has ends 31 and 31' which extend from the block 42 a length of preferably 12"–18". The monofilament 30' is threaded into and through channels 50, 52 by entering channel 50 at its first opening and exiting channel 50 at its second opening, passing about the outer peripheral 44 of the block 42 and entering the first opening of the second channel 52, passing through the second channel 52 and exiting the second opening of the second channel 52, passing about the outer peripheral 44 of the block 42 and being threaded again through the channel 50, entering the first opening and exiting out the second opening of channel 50. Thus, the end 31 extends from the second opening of channel 50 and end 31' of the monofilament extends from the first opening of channel 50.

Once the monofilament is threaded through the block 42 in the manner described, it will have two ends 31, 31' extending from it and both ends of the monofilament can be used as cutting elements for the string trimmer. This doubles the efficiency of the cutting of the string trimmer as compared to those prior art devices in which only one end of the monofilament extends from the string trimmer. Moreover, because two cutting elements are extending from the replacement head, the fraying and destruction of the ends 31, 31' of the monofilament 30' is reduced and the time of use of the monofilament 30' is substantially greater than the time of use of the end 31 of the monofilament 30 in the prior art devices.

To reduce the tendency of the monofilament to be cut at the point where the opening and exit of the two channels intersect with the outer perimeter of the block of material, the point of intersection is rounded or beveled as shown at 54. However the device of the present invention is not immune to destruction of the monofilament 30' and when the monofilament is destroyed, it has to be replaced. The process then is to stop the rotation of the shaft 26 and remove the monofilament 30'. A new length of monofilament 30' can then be threaded into the channels 50, 52 as previously described to re-thread and re-arm the string trimmer.

The replacement head that I have developed and that is described herein provides a more efficient cutting mechanism that requires less frequent change or replacement of the monofilament, and which, because of the absence of parts that move relative to each other can be constructed from a solid core of metal material and essentially impervious to destruction or damage.

The benefits and advantages of my improved replacement head for string trimmers can be seen and understood from the description of the preferred embodiment. It is understood that the shape of the replacement head can be modified as compared to the shape of the preferred embodiment described herein without deviating from the spirit and intent of the present invention, the scope and extent of which is defined in the claims wherein:

What I claim is:

1. A replaceable cutting head for a string trimmer including a block of material, the block of material having an elongated shape with an axis, an outer perimeter and a top and bottom, a counterbore extending into the block of material from the top thereof penetrating partially into the block of material, a first channel and a second channel passing through the block of material, each being adjacent to and spaced from the bottom of the block, the first channel and the second channel penetrating through the block and extending from the outer perimeter on one side of the block to the outer perimeter on an opposite side of the block, one of said channels spaced from the bottom of the block a greater distance than the other of said channels, mid a monofilament extending through the first and second channels, said monofilament having two ends with one end of the monofilament extending from the block in one direction and the other end of the monofilament extending from the block in another direction.

2. The replaceable cutting head for a string trimmer as described in claim 1 wherein the block material is cylindrically shaped.

3. The replaceable cutting head for a string trimmer as described in claim 1 wherein the first channel and the second channel are elongated and each has an axis and the axes of the first channel and the second channel are substantially perpendicular to the axis of the block material.

4. The replaceable cutting head for a string trimmer as described in claim 3 wherein the axis of the first channel is substantially perpendicular to the axis of the second channel.

5. The replaceable cutting head for a string trimmer as described in claim 1 wherein the first channel and the second channel each has an opening end and an exit end and the monofilament extends through the first channel twice mid the second channel once.

6. The replaceable cutting head for a string trimmer as described in claim 5 wherein the opening ends and the exit ends of the first and second channels are shaped to merge into the perimeter of the block of material to eliminate sharp edges at the point where the opening ends and the exit ends intersect with the perimeter of the block of material.

7. The replaceable cutting head for a string trimmer as described in claim 1 wherein the counterbore is internally threaded.

8. The replaceable cutting head for a string trimmer as described in claim 1 wherein the counterbore terminates prior to passing through the block of material.

9. The replaceable cutting head for a string trimmer as described in claim 1 wherein the ends of said monofilament extend from the block a length in the range of 12"–18".

* * * * *